United States Patent
Althaus et al.

(10) Patent No.: US 6,722,793 B2
(45) Date of Patent: Apr. 20, 2004

(54) OPTICAL BIDIRECTIONAL TRANSCEIVER MODULE HAVING A PIN ELEMENT WITH INTEGRATED WDM FILTER

(75) Inventors: Hans-Ludwig Althaus, Lappersdorf (DE); Gerhard Kuhn, Köfering (DE); Alfred Hartl, Pettendorf (DE); Markus Wicke, Lappersdorf-Einhausen (DE)

(73) Assignee: Infineon Technologies AG, Munich (DE)

( * ) Notice: Subject to any disclaimer, the term of this patent is extended or adjusted under 35 U.S.C. 154(b) by 245 days.

(21) Appl. No.: 09/922,477

(22) Filed: Aug. 3, 2001

(65) Prior Publication Data

US 2002/0021872 A1 Feb. 21, 2002

(30) Foreign Application Priority Data

Aug. 3, 2000 (DE) .......................................... 100 37 902

(51) Int. Cl.⁷ .............................. G02B 6/36; H04B 10/00
(52) U.S. Cl. .............................. 385/92; 385/88; 385/94; 398/128; 398/129
(58) Field of Search .............................. 385/88, 89, 90, 385/92, 93, 94, 139, 14; 398/128, 129

(56) References Cited

U.S. PATENT DOCUMENTS

| | | | | |
|---|---|---|---|---|
| 4,969,712 A | * | 11/1990 | Westwood et al. | 385/14 |
| 5,664,035 A | * | 9/1997 | Tsuji et al. | 385/24 |
| 6,028,708 A | * | 2/2000 | Gramann et al. | 359/629 |
| 6,097,521 A | * | 8/2000 | Althaus et al. | 398/139 |

FOREIGN PATENT DOCUMENTS

EP  0 974 856 A2  1/2000  ............... 385/88 X

OTHER PUBLICATIONS

Althaus et. al., U.S. patent application Publication No. U.S. 2002/0021872 A1, published Feb. 21, 2002.*

* cited by examiner

Primary Examiner—Brian M. Healy
(74) Attorney, Agent, or Firm—Laurence A. Greenberg; Werner H. Stemer; Ralph E. Locher

(57) ABSTRACT

An optical bidirectional transceiver module includes a module body having an opening, an inner hollow space and a fiber pin pushed through the opening into the inner hollow space. The fiber pin has a centric bored hole in which a light-conducting fiber is guided. A wavelength-selective filter or a beam splitter is located at a beveled end surface of the fiber pin. Radiation from an externally coupled light waveguide is emitted through the light-conducting fiber and reflected at the filter to a first optoelectronic component (transmitter). Received light radiation passes through the filter and impinges on a second optoelectronic component (receiver).

13 Claims, 1 Drawing Sheet

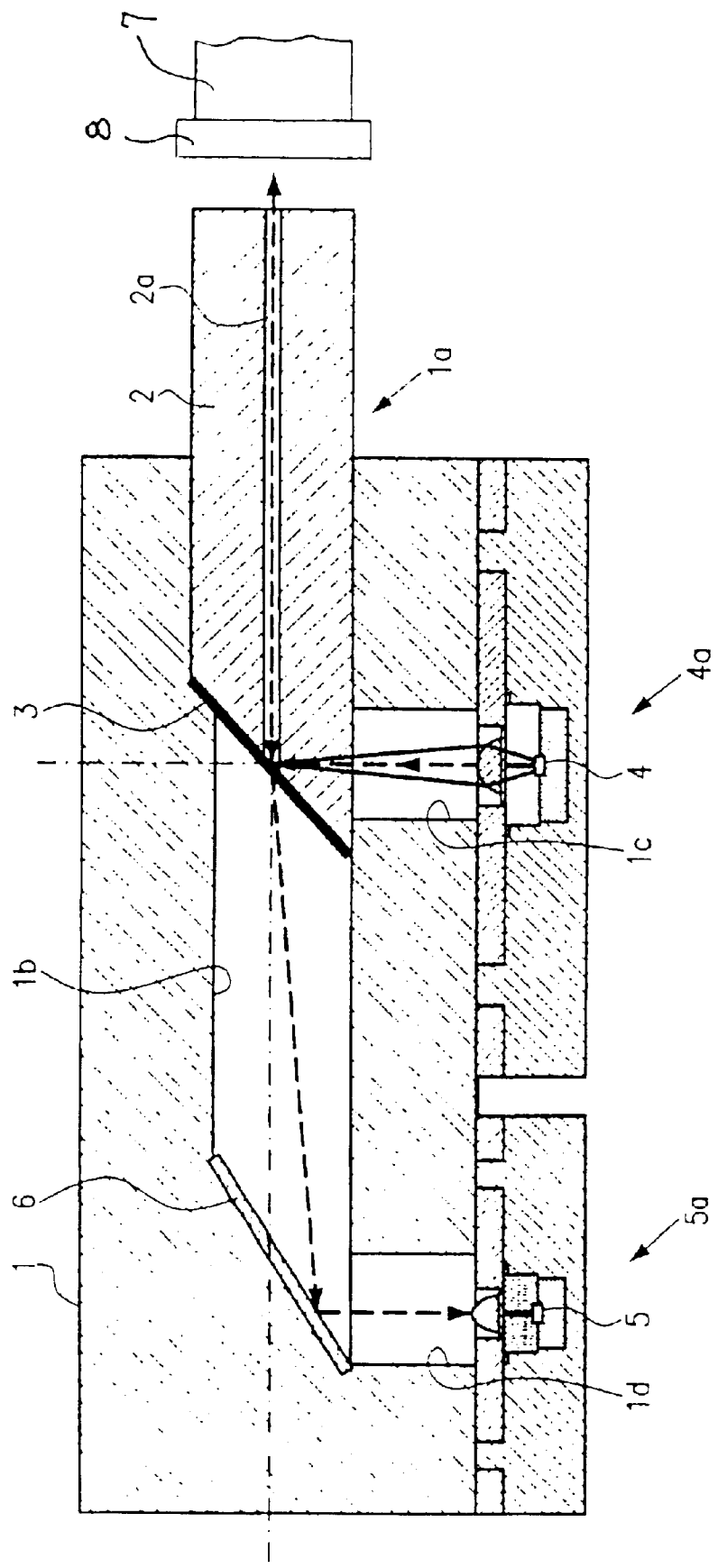

OPTICAL BIDIRECTIONAL TRANSCEIVER MODULE HAVING A PIN ELEMENT WITH INTEGRATED WDM FILTER

BACKGROUND OF THE INVENTION

Field of the Invention

The present invention relates to an optical bidirectional transceiver module for bidirectional signal transmission through the use of a light waveguide.

In order to exploit the high data transmission capacity of optical light waveguides, optical communication systems are increasingly used in which light radiation of two or more different wavelengths is transmitted through a single light waveguide. Among those systems, bidirectional transmission systems are known in which light radiation of a first wavelength is transmitted along one direction in the light waveguide and light radiation of a second wavelength is transmitted along an opposite direction in the light waveguide. The two wavelengths can be the same or can be different from one another.

Optoelectronic modules that contain both a transmission unit and a receiving unit are located at end points of the light waveguide. So-called BIDI modules, which can transmit light of a wavelength $\lambda_1$ and can receive light of a wavelength $\lambda_2$ are used to provide bidirectional data transmissions through a light waveguide with two different wavelengths. In such modules it is necessary to integrate a suitable filter upstream of the receiving unit which filters out the undesired wavelength for the suppression of crosstalk. So-called WDM (Wavelength Division Multiplex) filters, known in the prior art, that have a wavelength-dependent filter characteristic, are used for that purpose. Filters of that type are usually constructed as so-called edge or cutoff filters. Such filters have an edge-shaped curve in the transmission characteristic for a particular wavelength. The filter acts as a highly reflective mirror at wavelengths above that edge, while it is essentially transparent for wavelengths below the edge. Specific embodiments are also known in which the two wavelengths being used are equal, and only a simple beam conductor is used as a filter.

In embodiments previously known from the prior art, the BIDI module was made up of a free-beam or free-radiation optical apparatus in which a WDM filter lamina was inserted into the free beam at an angle of 45°, in an inner hollow chamber of the module. However, those embodiments are relatively complicated to manufacture, because suitable fastening structures to which the filter lamina can be fastened must be provided in the inner hollow space of the module. In addition, the manner of fastening of the filter laminae makes a rapid, and in particular automatic, manufacture of the module more difficult.

SUMMARY OF THE INVENTION

It is accordingly an object of the invention to provide an optical bidirectional transceiver module having a pin element with an integrated WDM filter, which overcomes the hereinafore-mentioned disadvantages of the heretofore-known devices of this general type and which can be manufactured more easily.

With the foregoing and other objects in view there is provided, in accordance with the invention, an optical bidirectional transceiver module for bidirectional signal transmission with a light waveguide, comprising a module body having an opening and an inner hollow space formed therein. A pin element protrudes through the opening at least partially into the inner hollow space. The pin element includes an inner end having an end surface with a beveled region. The beveled region acts as a beam splitter or divider and/or a filter. A first optoelectronic component is light-optically coupled with the beam splitter through radiation reflected at the beam splitter. A second optoelectronic component is light-optically coupled with the beam splitter through radiation transmitted by the beam splitter. One of the optoelectronic components is a transmitter and the other of the optoelectronic components is a receiver.

An essential advantage of the invention is that the module body or element can be manufactured more easily. No complicated measures or precautions need be taken in the manufacture of the module body for the later fastening of a filter lamina. In particular, no special fastening elements for the later attachment of the filter lamina need be disposed or formed in the inner hollow space of the hollow body. Rather, the pin element with the integrated beam splitter/filter can easily be pushed through the module opening into the inner hollow space of the module body, and can be fastened there, for example by gluing.

In accordance with another feature of the invention, the beveled region is formed by a wavelength-selective filter that has a high reflectivity at a first wavelength and is highly transmissive at a second wavelength. This wavelength-selective filter can, for example, be an edge filter that acts as a <95% mirror for wavelengths that are greater than the wavelengths at an edge in the transmission function of the filter, but which is transparent for all wavelengths below this edge. Such a filter is designated as either a high-pass filter or a low-pass filter depending on whether a wavelength scale or a frequency scale is used. Such a WDM filter allows bidirectional transmission at two different wavelengths. The wavelength-selective filter can be glued onto the beveled region of the pin element. The wavelength-selective filter can likewise be attached to the beveled region in the form of layers sputtered or metallized onto the beveled region, for example as a multiple layer system of dielectric layers.

However, an embodiment can also be provided in which the beveled region of the pin element acts as a simple beam splitter, through which a significant part of the incident light radiation is reflected and the remaining part is transmitted. In accordance with a further feature of the invention, one optoelectronic component can be a transmitter that emits at a wavelength, and the second optoelectronic component can be a receiver that is sensitive at the same wavelength. A 3 dB beam splitter can be used that is glued onto the beveled region of the pin element as a beam splitter lamina, or is applied in the form of dielectric layers. However, in an even simpler embodiment, the pin element is formed of a thoroughly transparent material, for example a glass material, and a beveled end surface forms a natural reflection surface that is, for example, beveled at the Brewster angle, and thus supplies a maximum reflection at this angle.

In accordance with an added feature of the invention, the pin element is a fiber pin having a central bored hole in which a light-conducting fiber is guided. This fiber pin can be made from a ceramic material. The fiber pin has, for example, a length of approximately 4 to 5 mm, and is made of a ceramic ferrule (for example, ZrO or the like), preferably having a diameter of 2.5 mm or 1.25 mm. The centric bored hole of the ferrule preferably has a diameter of 0.128 mm, and inside the bored hole there is glued a glass fiber such as a single-mode fiber or a multi-mode fiber having an external jacket or cladding diameter of 0.125 mm, for example.

In accordance with an additional feature of the invention, the pin element can be constructed in such a way that it can be coupled to a light waveguide at its outer end. If the pin element is a fiber pin, the coupling with the light waveguide can take place in a known manner through a so-called butt or blunt coupling of the fiber pin to the light waveguide, using a suitable plug pin, preferably having the same dimensions as the fiber pin, and a slotted sleeve that guides the two pins against one another without play and with sufficient precision.

However, it can likewise be provided that the pin element is pushed completely into the inner hollow space of the module and is fastened there. In this case, it can be provided that the light waveguide to be coupled is likewise pushed into the module opening, so that light radiation exiting from the light waveguide can penetrate into the pin element, or into the light-conducting fiber centered in a pin element constructed as a fiber pin.

In accordance with yet another feature of the invention, internally, the module according to the invention can be created in such a way that an additional mirror works together with the optoelectronic component which is coupled in a lightoptical manner with the beam splitter through the radiation transmitted by the beam splitter. This mirror can terminate the inner hollow space of the module. However, the mirror can also be omitted, and the inner hollow space can extend up to an end of the module situated opposite the light entry opening of the module. The corresponding optoelectronic component can be disposed at this end.

The optoelectronic components can be placed in corresponding openings of the module as TO modules, in a known manner. However, in a preferred embodiment, the module according to the invention is constructed as a module that can be mounted on the surface, i.e., an SMT (Surface Mounting Technology) capable module. In that case, the optoelectronic components are disposed on one and the same side of the module, and electrical supply lines are routed so as to go out from the components to a common mounting surface of the module, and planar terminal pads are provided there.

Other features which are considered as characteristic for the invention are set forth in the appended claims.

Although the invention is illustrated and described herein as embodied in an optical bidirectional transceiver module having a pin element with an integrated WDM filter, it is nevertheless not intended to be limited to the details shown, since various modifications as well as structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a diagrammatic, sectional view, of an exemplary embodiment of an optical bidirectional transceiver module according to the invention.

DESCRIPTION OF THE PREFERRED EMBODIMENTS

Referring now in detail to the single FIGURE of the drawing, there is seen a module which includes a module body 1 having a pin introduction opening 1a and an inner hollow space 1b connected to the pin introduction opening 1a. A pin element, constructed as a fiber pin 2, is introduced into the pin introduction opening 1a and is fastened therein, e.g. by gluing. The fiber pin 2 is made, for example, of ceramic material, such as ZrO or the like, and has an axial centric bored hole in which a light-conducting fiber 2a is glued. The fiber pin 2 has an inner end with a beveled end surface on which a wavelength-selective filter (WDM filter) 3 is attached. The filter 3 can be applied on the beveled end surface of the fiber pin 2 in the form of multiple dielectric layers. It can also be provided that the end surface of the fiber pin 2 is not beveled in its entirety, but rather only in a region in which the light-conducting fiber 2a ends, since what is important is only the deflection of a radiation bundle exiting from the light-conducting fiber 2a.

The filter 3 is constructed, for example, as an edge filter, so that it lets through light radiation having a wavelength below the edge and reflects light radiation having a wavelength above the edge. The filter 3 is coupled in a light-optical manner with a first optoelectronic component 4 with respect to the light radiation reflected at the filter 3.

The filter 3 is coupled in light-optical manner with a second optoelectronic component 5 with respect to the light radiation transmitting by the filter 3. In the illustrated exemplary embodiment, the first optoelectronic component 4 is a transmitter and the second optoelectronic component 5 is a receiver. However, the reverse case can also occur, in which the first optoelectronic component 4 is a receiver and the second optoelectronic component 5 is a transmitter.

The inner hollow space 1b of the module body 1 is terminated at its left end by a beveled end surface that is provided with a mirror 6, at which the received light radiation is reflected and directed onto the second optoelectronic component 5. The filter 3 and the mirror 6 are thus positioned obliquely in such a way that they are coupled in a light-optical manner with the optoelectronic components that can be situated on one side of the module body 1. Correspondingly, the inner hollow space 1b is connected with hollow spaces 1c and 1d, which lead outward at right angles from the inner hollow space 1b to a corresponding lateral surface of the module body 1, to which the optoelectronic components 4 to 5 can be coupled. The inner hollow spaces 1c and 1d are respectively associated with the filter 3 and to the mirror 6.

As is shown, the optoelectronic components 4 and 5 can be built into transmitter and receiver subcomponents 4a and 5a.

The subcomponents can be manufactured and tested as a separate housing, and can then be adjusted and fixed on the module body 1. The subcomponents 4a and 5a can be constructed so as to be SMD-capable, so that the completely assembled module can be soldered onto a board using SMT technology.

The mirror 6 can likewise be constructed from dielectric layers deposited on the beveled end surface of the inner hollow space 1b. It can also be provided that, instead of the mirror 6, an additional wavelength-selective filter 3 is provided, that the inner hollow space 1b continues behind this additional filter 3 and that an additional optoelectronic component, such as a transmitter or a receiver, is situated on module body 1.

In the manner already described, a light waveguide 7, in which the beam bundle emitted by the transmitter 4 and the beam bundle received by the receiver 5 can be guided bidirectionally, can be coupled to the outer end of the fiber pin 2 by a coupling 8.

We claim:

1. An optical bidirectional transceiver module for bidirectional signal transmission with a light waveguide, the module comprising:
   a module body having an opening formed therein and having an inner hollow space formed therein;
   a pin element being a fiber pin having a central bored hole and a light-conducting fiber guided in said central bored hole, said pin element protruding through said opening at least partially into said inner hollow space, and said pin element including an inner end having an end surface with a beveled region, said beveled region acting as at least one of a beam splitter and a filter;
   a first optoelectronic component light-optically coupled with said beam splitter through radiation reflected at said beam splitter; and
   a second optoelectronic component light-optically coupled with said beam splitter through radiation transmitted by said beam splitter;
   one of said optoelectronic components being a transmitter and the other of said optoelectronic components being a receiver.

2. The module according to claim 1, wherein:
   said beveled region is formed by a wavelength-selective filter having a high reflectivity at a first wavelength and being highly transmissive at a second wavelength; and
   said one optoelectronic component being a transmitter emits at one of the two wavelengths, and said other optoelectronic component being a receiver is sensitive at the other of the two wavelengths.

3. The module according to claim 1, wherein:
   said one optoelectronic component being a transmitter emits at one wavelength, and said other optoelectronic component being a receiver is sensitive at the one wavelength; and
   a part of the radiation at the one wavelength is reflected through said beam splitter and a remaining part of the radiation at the one wavelength is transmitted through said beam splitter.

4. The module according to claim 1, wherein said fiber pin is manufactured from a ceramic material.

5. The module according to claim 1, wherein said fiber pin is manufactured from ZrO.

6. The module according to claim 1, wherein said pin element has an outer end to be coupled to a light waveguide.

7. The module according to claim 1, including an additional mirror light-optically coupling said second optoelectronic component with said beam splitter.

8. An optical bidirectional transceiver module for bidirectional signal transmission with a light waveguide, the module comprising:
   a module body having an opening formed therein and having an inner hollow space formed therein;
   a pin element protruding through said opening at least partially into said inner hollow space, said pin element having an outer end to be coupled to a light waveguide, and
   said pin element including an inner end having an end surface with a beveled region, said beveled region acting as at least one of a beam splitter and a filter;
   a first optoelectronic component light-optically coupled with said beam splitter through radiation reflected at said beam splitter; and
   a second optoelectronic component light-optically coupled with said beam splitter through radiation transmitted by said beam splitter;
   one of said optoelectronic components being a transmitter and the other of said Optoelectronic components being a receiver.

9. The module according to claim 8, wherein:
   said beveled region is formed by a wavelength-selective filter having a high reflectivity at a first wavelength and being highly transmissive at a second wavelength; and
   said one optoelectronic component being a transmitter emits at one of the two wavelengths, and said other optoelectronic component being a receiver is sensitive at the other of the two wavelengths.

10. The module according to claim 8, wherein:
    said one optoelectronic component being a transmitter emits at one wavelength, and said other optoelectronic component being a receiver is sensitive at the one wavelength; and
    a part of the radiation at the one wavelength is reflected through said beam splitter and a remaining part of the radiation at the one wavelength is transmitted through said beam splitter.

11. An optical bidirectional transceiver module for bidirectional signal transmission with a light waveguide, the module comprising:
    a module body having an opening formed therein and having an inner hollow space formed therein;
    a pin element protruding through said opening at least partially into said inner hollow space, said pin element including an inner end having an end surface with a beveled region, said beveled region acting as at least one of a beam splitter and a filter;
    a first optoelectronic component light-optically coupled with said beam splitter through radiation reflected at said beam splitter;
    a second optoelectronic component; and
    an additional mirror light-optically coupling said second optoelectronic component with said beam splitter through radiation transmitted by said beam splitter;
    one of said optoelectronic components being a transmitter and the other of said optoelectronic components being a receiver.

12. The module according to claim 11, wherein:
    said beveled region is formed by a wavelength-selective filter having a high reflectivity at a first wavelength and being highly transmissive at a second wavelength; and
    said one optoelectronic component being a transmitter emits at one of the two wavelengths, and said other optoelectronic component being a receiver is sensitive at the other of the two wavelengths.

13. The module according to claim 11, wherein:
    said one optoelectronic component being a transmitter emits at one wavelength, and said other optoelectronic component being a receiver is sensitive at the one wavelength; and
    a part of the radiation at the one wavelength is reflected through said beam splitter and a remaining part of the radiation at the one wavelength is transmitted through said beam splitter.

* * * * *